(12) United States Patent
Claeys et al.

(10) Patent No.: US 12,495,508 B2
(45) Date of Patent: Dec. 9, 2025

(54) ELECTRONIC DEVICE WITH PIVOTING MAGNETIC MOUNTING SYSTEM AND MAGNET SUPPORT BRACKET FOR USE THEREWITH

(71) Applicant: UBICQUIA, INC., Fort Lauderdale, FL (US)

(72) Inventors: Patrick Stuart Claeys, Weston, FL (US); Claudio Santiago Ribeiro, Evanston, IL (US); Elliott Earl Murray, Plantation, FL (US); Ian B. Aaron, Fort Lauderdale, FL (US); Travis Ronald Coleman, Sunrise, FL (US)

( * ) Notice: Subject to any disclaimer, the term of this patent is extended or adjusted under 35 U.S.C. 154(b) by 0 days.

(21) Appl. No.: 18/200,550

(22) Filed: May 22, 2023

(65) Prior Publication Data

US 2023/0413462 A1 Dec. 21, 2023

Related U.S. Application Data

(60) Provisional application No. 63/344,988, filed on May 23, 2022.

(51) Int. Cl.
*F16M 13/00* (2006.01)
*F16M 13/02* (2006.01)
*H05K 5/02* (2006.01)

(52) U.S. Cl.
CPC ......... *H05K 5/0217* (2013.01); *F16M 13/022* (2013.01)

(58) Field of Classification Search
CPC .... H05K 5/0217; F16M 13/022; F16M 13/02; E05Y 2201/46; E05Y 2600/52;
(Continued)

(56) References Cited

U.S. PATENT DOCUMENTS

| 4,470,106 A | 9/1984 | Norton |
| 5,201,896 A | 4/1993 | Kruszewski |

(Continued)

OTHER PUBLICATIONS

U.S. Patent & Trademark Office as International Searching Authority, International Search Report issued in connection with counterpart International Application No. PCT/US2023/023179, Aug. 4, 2023, 2 pages.

(Continued)

*Primary Examiner* — Amy J. Sterling
(74) *Attorney, Agent, or Firm* — Daniel C. Crilly; Pablo Meles

(57) ABSTRACT

An electronic device includes a housing defining a magnet attachment area, a bracket positioned in the magnet attachment area, and a magnet attached to the bracket. The bracket is configured to permit angular displacement of at least a portion thereof about an axis of rotation by no more than a predetermined displacement. The bracket may include a platform and a pair of spaced apart pivot arms. In such a case, the platform is configured to support the magnet and the pivot arms are attached to the platform at separate locations aligned along the axis of rotation. Alternatively, the bracket may include a platform, a pair of pivot arms, and a pin. The pivot arms may each define a respective pin aperture and be orthogonal to the platform and spaced apart such that the platform is positioned between them. The pin is positioned in the pin apertures of the pivot arms.

20 Claims, 7 Drawing Sheets

(58) Field of Classification Search
CPC ............. E05Y 2600/60; E05Y 2999/00; H01F 7/0221; H01F 7/0252
See application file for complete search history.

(56) References Cited

U.S. PATENT DOCUMENTS

| | | | | |
|---|---|---|---|---|
| 8,616,335 | B1 * | 12/2013 | Mosier | .................... E06C 7/188 |
| | | | | 248/206.5 |
| 9,273,819 | B2 * | 3/2016 | Pinchevski | ............ F16M 11/38 |
| 9,472,937 | B2 * | 10/2016 | Klein | .................... H01F 7/0221 |
| 11,162,633 | B2 * | 11/2021 | Sullivan | ............... F16M 13/022 |
| 2013/0162128 | A1 | 6/2013 | Yu | |
| 2016/0091924 | A1 | 3/2016 | Aoki et al. | |
| 2018/0203658 | A1 | 7/2018 | Files et al. | |

OTHER PUBLICATIONS

U.S. Patent & Trademark Office as International Searching Authority, Written Opinion of the International Searching Authority in connection with counterpart International Application No. PCT/US2023/023179, Aug. 4, 2023, 5 pages.

* cited by examiner

ELECTRONIC DEVICE WITH PIVOTING MAGNETIC MOUNTING SYSTEM AND MAGNET SUPPORT BRACKET FOR USE THEREWITH

CROSS-REFERENCE TO RELATED APPLICATIONS

The present application claims the benefit of and priority upon U.S. Provisional Patent Application No. 63/344,988, which was filed on May 23, 2022, and is incorporated herein by this reference as if fully set forth herein.

TECHNICAL FIELD

The present disclosure generally relates to magnetic mounting devices and systems for electronic devices. More particularly, but not exclusively, the present disclosure relates to magnetic mounting devices and systems that pivot.

BACKGROUND

As is known, many different types of electronic devices use magnets to attach the device to a metal surface. When using a magnet as part of an attachment mechanism, the mechanism is typically configured to secure the associated electronic device to a flat metal surface. Existing magnetic mounting systems are not flexible enough to provide sufficient attachment force for non-flat surfaces, such as curved or arched surfaces. No magnetic attachment mechanism is known to accommodate attachment of an electronic device to multiple types of surface geometries with adequate attachment force.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art.

SUMMARY

According to one exemplary embodiment of the present disclosure, an electronic device includes a housing defining a magnet attachment area, a bracket positioned in the magnet attachment area, and a magnet attached to the bracket. In such embodiment, the bracket is configured to permit angular displacement of at least a portion thereof about an axis of rotation by no more than a predetermined angular displacement, According to an alternative exemplary embodiment of the present disclosure, the electronic device may also include at least one pivot member located in the magnet attachment area and upon which the bracket is positioned. In such a case, the pivot member or members may be integrated (e.g., molded) into or attached to one or more external surfaces of the housing.

According to a further alternative exemplary embodiment of the present disclosure, the electronic device may include a pair of spaced apart pivot members located in the magnet attachment area. In such a case, the bracket includes a pair of pivot arms sized and shaped to rest upon and rotate about the pair of pivot members.

According to yet another exemplary embodiment of the present disclosure, the pivot member or each pivot member (where a pair of pivot members is used) may include an arched portion having a first arc radius. In such a case, a portion of the bracket to which the magnet is not directly attached, such as one or more pivot arms of the bracket, is arched with or at a second arc radius that is greater than the first arc radius. The radius of an arc or segment is the radius of the circle of which the arc or segment is a part. The amount that the arc radii differ is sufficient to allow the bracket, or at least a portion thereof supporting the magnet, to pivot or rotate up to the predetermined (e.g., maximum) angular displacement. In an alternative version of this embodiment of the present disclosure, the bracket may include a platform having a first surface and a second surface, where at least a portion of the first surface of the bracket supports the magnet and where at least a portion of the second surface of the magnet is arched with the second arc radius. The platform is preferably rigid but may alternatively conform to the shape of the magnet.

According to another alternative exemplary embodiment of the present disclosure, the bracket may include a platform to which the magnet is attached, a pair of pivot arms spaced apart along the axis of rotation and each defining a respective pin aperture, and a pin positioned in and/or through the pin apertures of the pivot arms. In this embodiment, the platform is positioned between the pair of pivot arms and each pivot arm is oriented in a direction substantially orthogonal to the platform. With regard to this exemplary embodiment, one pivot arm of the pair of pivot arms may be connected to a first end of the platform and the other pivot arm of the pair of pivot arms may be connected to a second, opposite end of the platform. Alternatively, the platform may define a cylindrical aperture through a length thereof and the pin may pass through the aperture of the platform.

According to yet another exemplary embodiment of the present disclosure, the electronic device may further include a second bracket positioned in the magnet attachment area or a second magnet attachment area and a second magnet attached to the second bracket. In this case, the second bracket is configured to permit angular displacement of at least a portion thereof about an axis of rotation by no more than a predetermined angular displacement, which may be equal to the permitted angular displacement of other brackets positioned in the magnet attachment area or respective magnet attachment areas. The second bracket may include a pair of pivot arms sized and shaped to rest upon and rotate about a pair of pivot members located in the applicable magnet attachment area. Alternatively, the second bracket may include a platform to which the magnet is attached, a pair of pivot arms spaced apart such that the platform is positioned between them and each defining a respective pin aperture, and a pin positioned in and/or through the pin apertures of the pivot arms.

According to further alternative exemplary embodiment of the present disclosure, an electronic device includes a housing defining a magnet attachment area, at least one arched pivot member located in the magnet attachment area, a bracket positioned at least in part upon the at least one pivot member, and a magnet attached to the bracket. In this exemplary embodiment, the bracket and the at least one pivot member are sized and shaped to permit angular displacement of at least a portion of the bracket about an axis of rotation by no more than a predetermined angular displacement.

According to one exemplary aspect of the further alternative exemplary embodiment, the electronic device may include a first pivot member and a second pivot member spaced apart from the first pivot member. Additionally, the bracket may include a platform configured to support the magnet, a first pivot arm attached to the platform at a first location (e.g., a first lengthwise end), and a second pivot arm attached to the platform at a second location (e.g., a second lengthwise end). In this case, the first pivot arm may be configured to rest upon the first pivot member and the second pivot arm may be configured to rest upon the second pivot member. Additionally, the first pivot arm and the second pivot arm are preferably aligned along the axis of rotation. Further, either or both pivot members may have a respective arc radius and either or both pivot arms of the bracket may include a respective arched portion having an arc radius that is greater than the arc radius of the pivot member upon which the pivot arm rests. Further, each pivot arm of the bracket may define an aperture sized and shaped to permit passage of a standoff for a fastener. In such a case, the fasteners and standoffs secure the pivot arms to the housing so as to permit angular displacement of the bracket and attached magnet.

According to a further alternative exemplary embodiment of the present disclosure, a magnet support bracket includes a platform configured to support a magnet on a surface thereof, a first pivot arm attached to the platform at a first location (e.g., one lengthwise end), and a second pivot arm attached to the platform at a second location (e.g., an opposite lengthwise end), wherein the pivot arms are aligned along an axis of rotation for the platform. The platform may be rectangularly shaped and generally flat or generally U-shaped. The platform may be additionally or alternatively configured to permit attachment of the magnet thereto with at least one fastener or with use of an adhesive. Each pivot arm may include an arched portion having an arc radius greater than an arc radius of a respective receiving member upon which the respective pivot arm is to be positioned. Each pivot arm may additionally or alternatively define an aperture sized and shaped to permit passage of a standoff for a fastener.

According to a further alternative exemplary embodiment of the present disclosure, an electronic device includes a housing defining a plurality of magnet attachment areas, a plurality of brackets positioned in the plurality of magnet attachment areas, and a plurality of magnets, wherein each magnet is attached to a respective bracket. Each bracket is configured to permit angular displacement of at least a portion thereof about a respective axis of rotation by no more than a predetermined angular displacement. The electronic device may also include, among other things, at least one pivot member located in each magnet attachment area. In such a case, each bracket may be positioned at least in part upon the pivot member or members in the associated magnet attachment area in which the bracket is positioned.

BRIEF DESCRIPTION OF THE DRAWINGS

Non-limiting and non-exhaustive embodiments are described with reference to the following drawings, wherein like reference numerals refer to like components or elements throughout the various views unless otherwise specified. The sizes and relative positions of elements in the drawings are not necessarily drawn to scale. For example, the shapes of various elements are selected, enlarged, and positioned to improve drawing legibility. The shapes of the elements as drawn have been selected for ease of recognition in the drawings and do not limit the subject matter of the appended claims.

DETAILED DESCRIPTION

In the following description, certain specific details are set forth to provide a thorough understanding of various disclosed embodiments. However, one skilled in the relevant art will recognize that embodiments may be practiced without one or more of these specific details, or with other methods, components, materials, etc. Also in these instances, well-known structures may be omitted or shown and described in reduced detail to avoid unnecessarily obscuring descriptions of the embodiments.

In general, the present disclosure relates to an electronic device with a pivoting or rotatable magnetic mounting system and a magnet support bracket for use therewith. The electronic device includes a housing defining a magnet attachment area, a magnet support bracket positioned in the magnet attachment area, and a magnet attached to the bracket. The bracket is configured to permit angular displacement of at least a portion of the bracket about an axis of rotation (e.g., a single axis) by no more than a predetermined angular displacement.

The electronic device incorporating the pivoting magnetic mounting system may be one of any number of devices intended for mounting to a metallic surface and is not limited to the electronic device(s) illustrated or described herein. For example, the electronic device may be a distribution transformer monitoring (DTM) device that is intended for use with and attachment to or within differently configured distribution transformers, such as an aerial, pole-mounted transformer having a generally cylindrical shape with an arched or curved attachment surface (convex on the outside of the transformer and convex on the inside of the transformer), or a pad mounted transformer having a generally rectangular shape with a flat attachment surface. Alternatively, the electronic device may be an Internet of Things (IoT) sensor, a camera, a motion sensor, a lighting unit, or any other electronic device intended to be mounted to a magnetically mountable surface.

Figure 1:
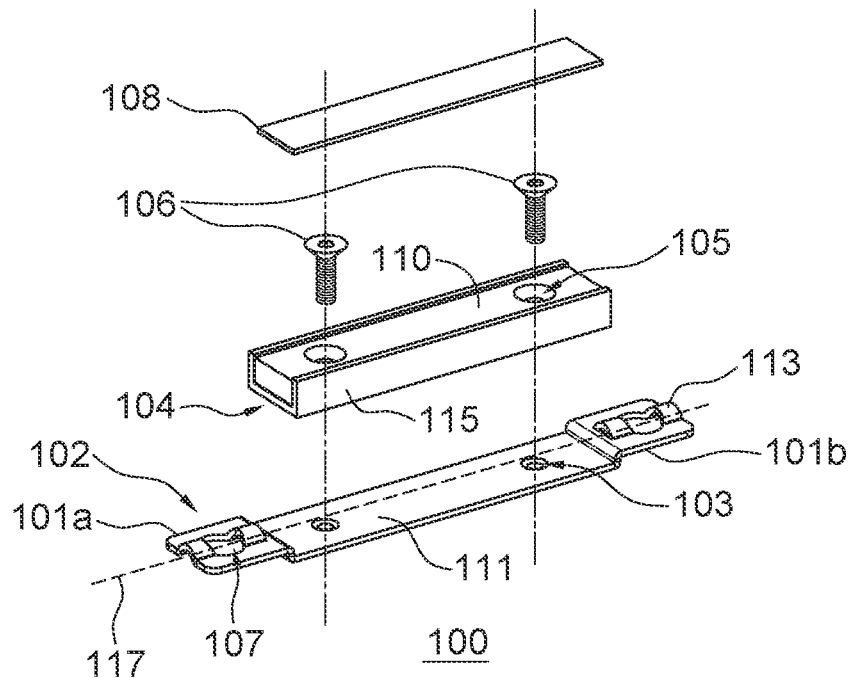
FIG. 1 illustrates a perspective, exploded view of a magnet and support bracket assembly, in accordance with one exemplary embodiment of the present disclosure.
Figure 2:
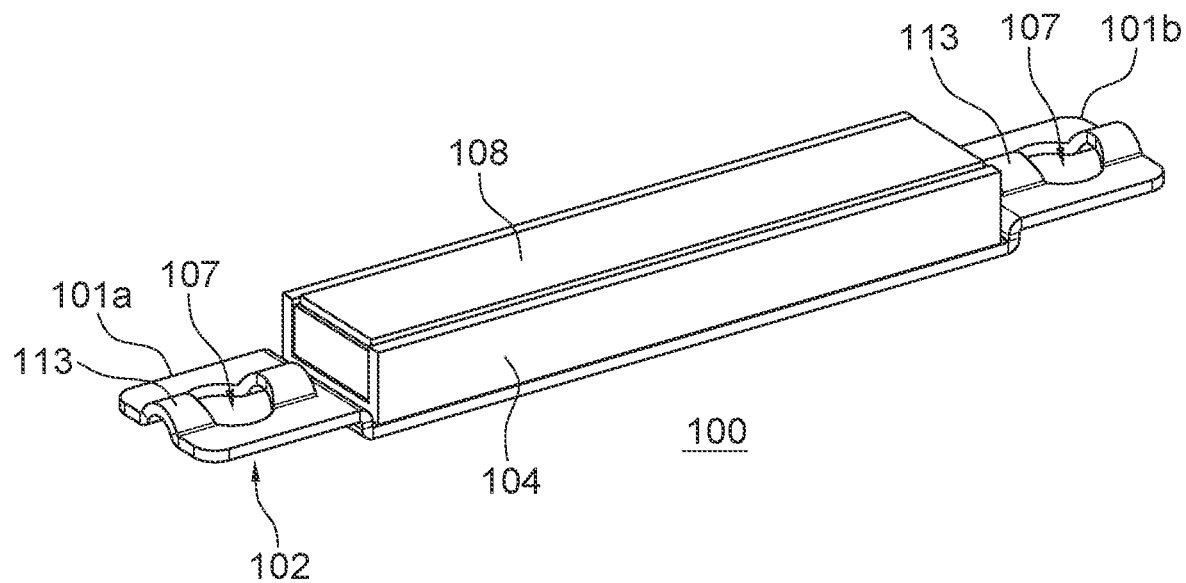
FIG. 2 illustrates a perspective view of the magnet and support bracket assembly of FIG. 1 in assembled form.

FIG. 1 illustrates a perspective, exploded view of a magnet and support bracket assembly 100, in accordance with one exemplary embodiment of the present disclosure. FIG. 2 illustrates the assembly 100 in assembled form. The assembly 100 includes a magnet support bracket 102, a magnet 104, and an optional impact resistance layer 108 to protect one or more exposed surface(s) of the magnet's magnetic element 110. The bracket 102 may include a portion to which the magnet 104 is directly attached and a portion to which the magnet 104 is not directly attached. For example, in the exemplary embodiment illustrated in FIGS. 1 and 2, the magnet support bracket 102 includes a platform 111 positioned between a pair of pivot arms 101a, 101b. The magnet 104 is directly attached to the platform 111 but is not directly attached to either pivot arm 101a, 101b. The platform 111 is preferably flat and rigid to fit flush against a housing (not shown) of an electronic device that includes the assembly 100 but may be alternatively shaped or moderately malleable to complement the attachment surface of the magnet 104 or the attachment surface of the electronic device housing.

The magnet 104 may be mounted or attached to the bracket's platform 111 using one or more fasteners, such as screws 106 (two shown for illustrative purposes), which pass through holes 105 in the magnet 104 and into threaded screw holes 103 in the platform 111. When screws 106 are used, they are preferably flathead screws and the holes 105 in the magnetic element 110 are preferably countersunk to accommodate the heads of the screws 106. The magnet 104 may optionally include a U-shaped support member 115 to protect the magnetic element 110 from possible damage. The support member 115 may be metal, plastic, or any other material appropriate for the magnet's intended use. When included, the support member 115 may define screw pass-through apertures that align with the holes 105 in the magnetic element 110 of the magnet 104 to allow the screws 106 to pass into the threaded holes 103 of the bracket platform 111.

Instead of being secured to the bracket platform 111 using one or more fasteners, such as a screw or screws 106, the magnet 104 may be affixed to the bracket 102 using other means, such as, for example, using one or more rivets or by applying an adhesive. An optional washer or washers (not shown) may also be used between the screws 106 and the screw holes 105 in the magnetic element 110 of the magnet 104.

The impact resistance layer 108, such as a pad, may be made of silicone or another appropriate material, which provides impact resistance when attaching an electronic device that includes the magnet bracket assembly 100 to a metal structure and may also provide some frictional holding force. It should be noted that the thickness of the impact resistance layer 108 may affect the pull force of the magnet 104. For example, material positioned in front of the magnetic element 110 of the magnet 104 may decrease the pull strength of the magnet 104 between $1/r^4$ to $1/r^7$, where r is the thickness of the impact resistance layer 108. Therefore, if used, the impact resistance layer 108 should be as thin as necessary to protect the exposed surface of the magnetic element 110 under the expected use conditions of the magnet 104.

Each pivot arm 101a, 101b of the exemplary magnet support bracket 102 is attached to the platform 111 at a respective location, such as at a respective lengthwise end of the platform 111. The pivot arms 101a, 101b are aligned along an axis 117 of rotation for the platform 111 and of the bracket 102. Each pivot arm 101a, 101b may include one or more arched elements 113 (two shown for each pivot arm 101a, 101b for illustrative purposes) sized and shaped to rest upon arched pivot members located in the magnet attachment area of the electronic device housing. Each pivot arm 101a, 101b may also define an optional aperture 107 sized and shaped to permit passage of a standoff for a fastener, such as a screw or bolt.

Figure 3:
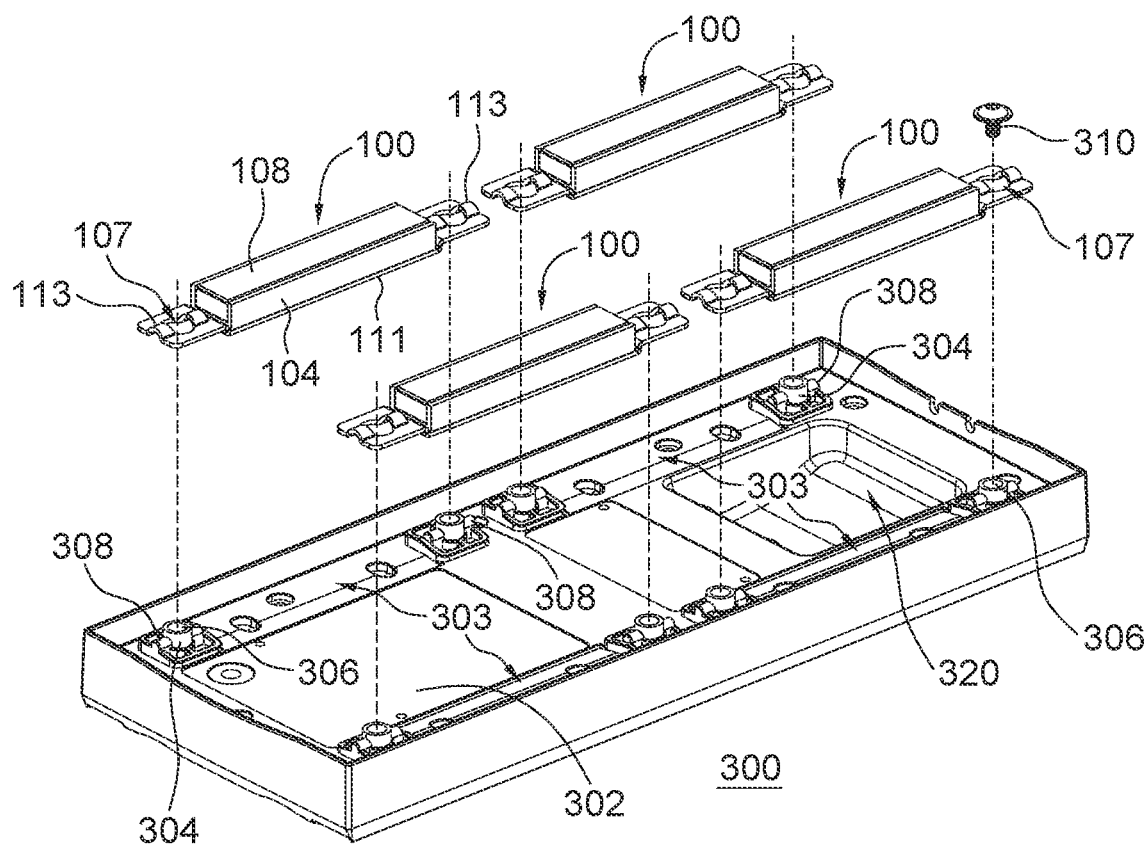
FIG. 3 illustrates a perspective, exploded view of an exemplary electronic device that includes magnets and support brackets in multiple magnet attachment areas defined by the electronic device's housing, in accordance with another exemplary embodiment of the present disclosure.
Figure 4:
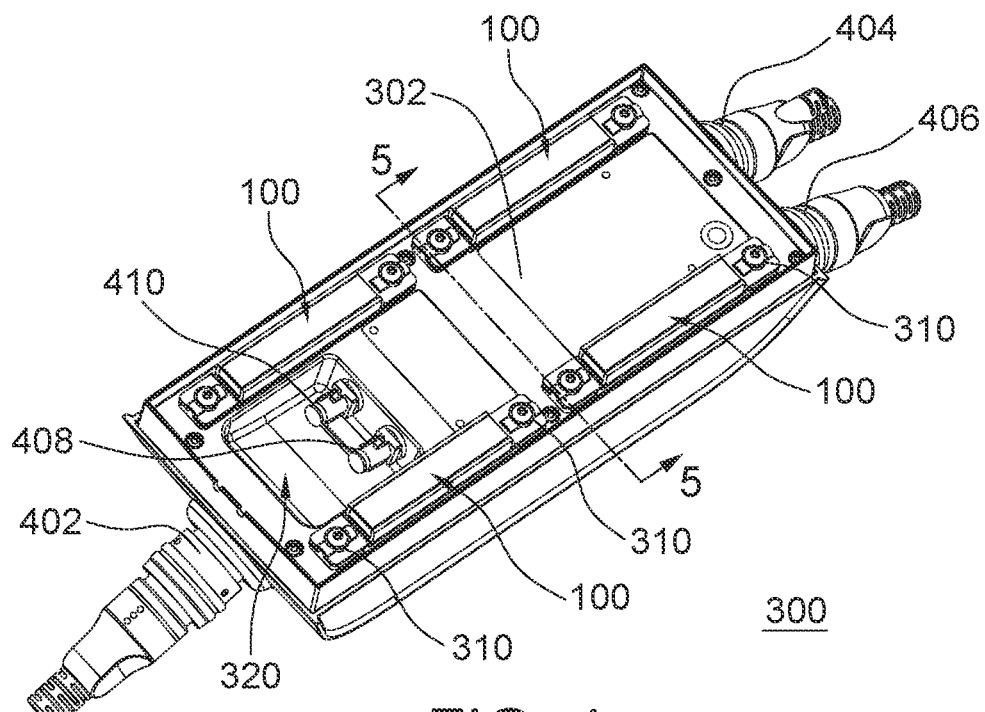
FIG. 4 illustrates a perspective view of the exemplary electronic device of FIG. 3 with magnets and support brackets installed in the magnet attachment areas of the housing.

FIGS. 3 and 4 illustrate perspective exploded and assembled views of an exemplary electronic device 300 that includes magnets 104 and support brackets 102 (collectively, magnet and support assemblies 100) in multiple magnet attachment areas 303 defined by the electronic device's housing 302, in accordance with another exemplary embodiment of the present disclosure. In some embodiments, each magnet attachment area 303 of the housing 302 includes at least one pivot member 308 upon which the bracket 102 of the assembly 100 is positioned. For example, as illustrated in FIGS. 3 and 4, each magnet attachment area 303 may include a pair (or pairs) of spaced apart pivot members 308 sized and shaped to permit appropriately sized and shaped pivot arms 101a, 101b of the magnet support bracket 102 to rest upon and rotate about the pivot members 308. In some embodiments, each pivot member 308 includes an arched portion (e.g., arched element 504 in FIG. 5), and a portion of the magnet support bracket 102 to which the magnet 104 is not directly attached, such as the pivot arms 101a, 101b or a bottom surface of the platform 111 (e.g., as discussed below with respect to FIG. 13), is arched or includes arched elements 113 with or at an arc radius that is greater than the arc radius of the arched portion 504 of the pivot member 308. The radius of an arc or segment is the radius of the circle of which it is a part.

Figure 5:
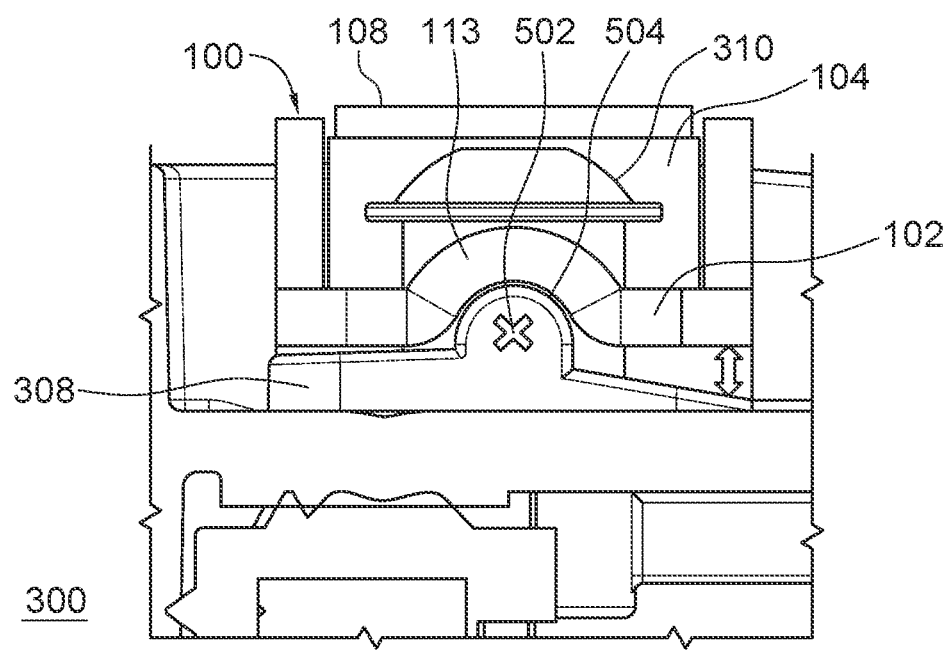
FIG. 5 illustrates a cross-sectional view of the exemplary electronic device of FIG. 4 along line 5-5.

As illustrated in FIGS. 2, 3, and 5, the arched portion 504 of each pivot member 308 receives a complementary arched portion 113 of a pivot arm 101a, 101b. In a preferred embodiment, the arch radius of the arched portion 113 of the pivot arm 101a, 101b is greater than the arc radius of the arched portion 504 of the pivot member 308 to allow the magnet and support bracket assembly 100 to freely rotate about the pivot member(s) 308. The ratio of the arc radius of the arched portion 504 of the pivot member 308 to the arc radius of the arched portion 113 of the pivot arm 101a, 101b together with the distance between the bottom of the pivot arm 101a, 101b and the surface of the housing 302 in the magnet attachment area 303 define the maximum range of angular displacement for the magnet and support assembly 100. According to one exemplary embodiment, the arc radius of the arched portion 504 of the pivot member 308 is 1.7 millimeters (mm), the arc radius of the arched portion 113 of the pivot arm 101a, 101b is 3.4 mm, and the maximum distance between the bottom of the pivot arm 101a, 101b and the surface of the housing 302 in the magnet attachment area 303 is selected to permit a maximum angular displacement of 20-30 degrees (+/−10-15 degrees from center). Alternatively, the arc radii of the arched portions 113, 504 and/or the heights of the surface of the housing 302 in the magnet attachment area 303 may be selected or configured to set the maximum angular displacement of the magnet and support bracket assembly 100 as so desired by one skilled in the art.

In some embodiments of the electronic device 300, such as the one illustrated in FIGS. 3 and 4, the magnet attachment area 303 of the housing 302 may include a threaded standoff 306 or other fastener receiving area that allows a fastener 310, such as a screw or bolt, to secure the magnet support bracket 102 to the housing 302 within the magnet attachment area 303. In such a case, the aperture 107 defined by the bracket's pivot arm(s) 101a, 101b is sized and shaped to permit passage of the standoff 306 therethrough.

Where the electronic device 300 is a DTM device, the device housing 302 may further define a well or cavity area 320 where communication ports 408, 410 or other ports, connectors, or components may reside. When included, the communication ports may be used for telemetry or geolocation and may include a GPS antenna port and/or a cellular antenna port. Additionally or alternatively, the electronic device 300 may further include a variety of other connectors or components attached to its housing 302, including connectors 402, 404, 406 for facilitating connection to Rogowski coil or current transformer cables, power cables, and various sensor cables.

It should be noted that the quantity of magnet and support bracket assemblies (such as assembly 100) used for a particular electronic device may be selected based on the size and weight of the electronic device and the intended use case for the electronic device. In some use cases, a single magnet and support bracket assembly may be sufficient for securing the electronic device to a structure; while in other cases, multiple magnet and support bracket assemblies may be required. For purposes of example only, the electronic device 300 illustrated in FIGS. 3 and 4 includes four magnet and support bracket assemblies 100 positioned in four magnet attachment areas 303. In general, multiple smaller rotating magnets can provide greater pull force in comparison to the pull force of a single larger magnet because the redirection of the flux fields by rotating or pivoting increases the pull force. Additionally, by using smaller magnets, the electronic device may weigh less.

Figure 6:
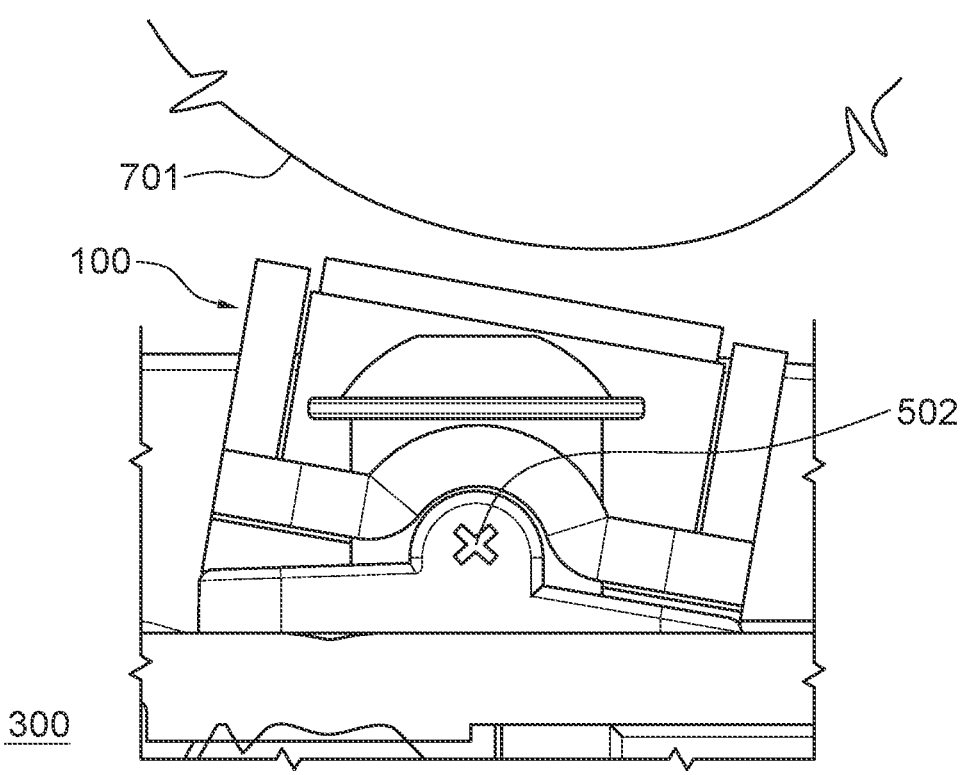
FIG. 6 illustrates the cross-sectional view of the electronic device of FIG. 4 as shown in FIG. 5 to depict exemplary angular displacement of the bracket and attached magnet as the electronic device approaches a metallic surface of a structure to which the electronic device is to be attached, in accordance with an exemplary embodiment of the present disclosure.

FIGS. 5 and 6 illustrate cross-sectional views of the electronic device 300 of FIG. 4 along the line 5-5 to depict exemplary angular displacement of the magnet support bracket 102 and its attached magnet 104 as the electronic device 300 approaches a metallic surface of a structure to which the electronic device 300 is to be attached, in accordance with an exemplary embodiment of the present disclosure. The structure may be a curved or arched structure, such as an aerial distribution transformer 700, or a flat structure, such as the wall of a pad mounted distribution transformer. If curved, the structure to which the electronic device 300 is to be attached may have a convex or a concave curvature.

Rotation of the magnet and support bracket assembly 100 occurs about an axis of rotation 502 running the length of a magnet attachment area 303 of the electronic device housing 302. As shown in FIG. 6, when the electronic device 300 is positioned near a metal object, such as a curved tank housing of an aerial distribution transformer 700, the magnet and support assembly 100 pivots or rotates an angular displacement due to the pull force of the magnet 104. In the embodiment depicted in FIGS. 5 and 6, the configuration of the pivot member 308 is such that the magnet and support assembly 100 is permitted to rotate more in one direction than in the other. Such a configuration of the pivot member 308 may be useful or preferred when the electronic device 300 will be attached to convex and flat surfaces only. In the exemplary embodiment illustrated in FIGS. 5 and 6, the maximum angular displacement of the magnet and support assembly 100 is in the range of 10-15 degrees.

Figure 7:
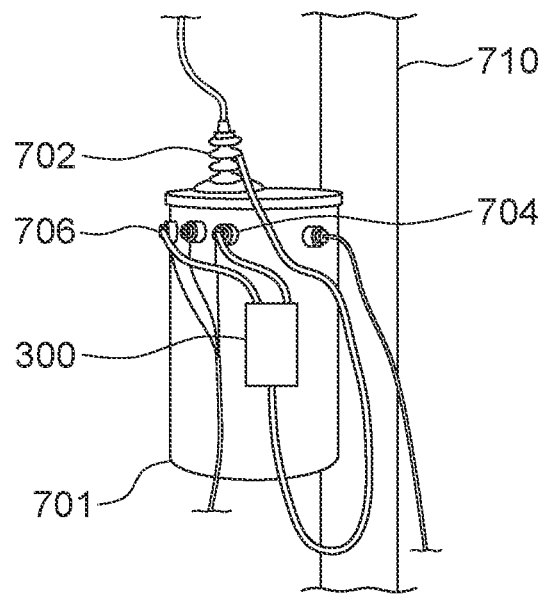
FIG. 7 illustrates the exemplary electronic device of FIG. 4 as attached to an aerial, cylindrically shaped distribution transformer, in accordance with another exemplary embodiment of the present disclosure.
Figure 8:
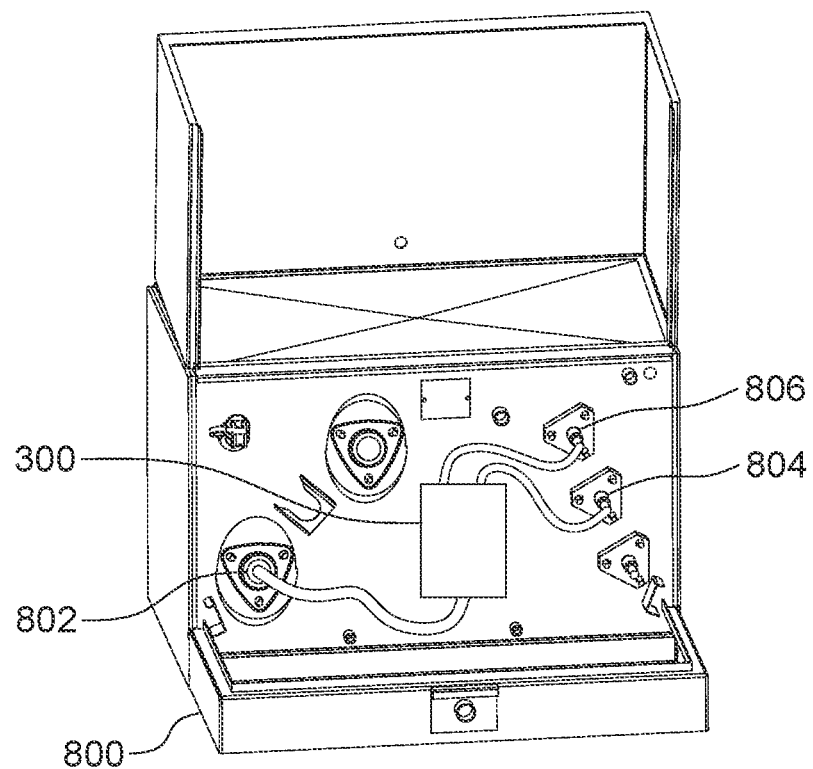
FIG. 8 illustrates the exemplary electronic device of FIG. 4 as attached to an interior wall of a pad mounted distribution transformer, in accordance with a further exemplary embodiment of the present disclosure.

FIGS. 7 and 8 illustrate two exemplary use cases for the electronic device 300 of FIG. 4. In the first exemplary use case, the electronic device 300 is a DTM device magnetically attached to the exterior surface of an aerial, cylindrically shaped distribution transformer 701. The transformer 701 may be secured to a utility pole 710 and include two primary side bushings 702 (one shown) and one or more secondary side bushings 704, 706 (two shown). Cables from Rogowski coils or current sensors appropriately coupled around the primary and secondary bushings 702, 704, 706 may be connected to the appropriate cable ports 402, 404, 406 of the electronic device 300.

In the second exemplary use case, the electronic device 300 is a DTM device magnetically attached to an interior wall (e.g., the wall separating the transformer tank and the transformer hatch) of a pad mounted distribution transformer 800. The transformer 800 may be positioned upon a concrete pad or on the ground and include two primary side bushings 802 and one or more secondary side bushings 804, 806 (two shown). Cables from Rogowski coils or current sensors appropriately coupled around the primary and secondary bushings 802, 804, 806 may be connected to the appropriate cable ports 402, 404, 406 of the electronic device 300.

Figure 9A:
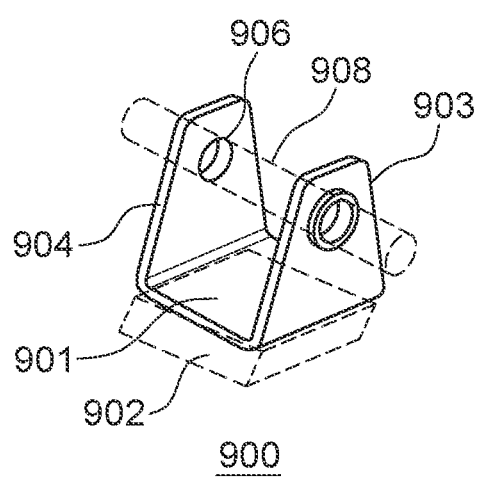
FIG. 9A illustrates a perspective view of an alternative magnet support bracket for an electronic device, in accordance with yet another exemplary embodiment of the present disclosure.
Figure 9B:
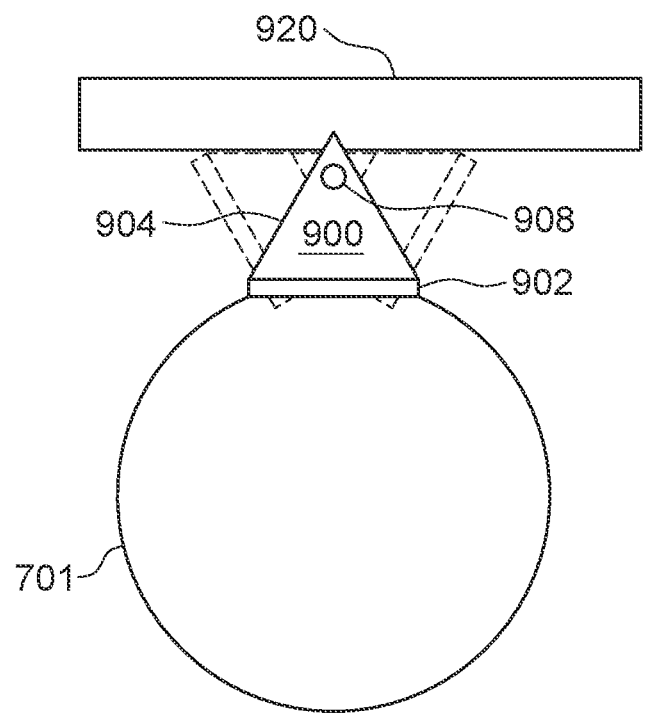
FIG. 9B illustrates a top view of an alternative exemplary electronic device including the magnet support bracket of FIG. 9A with a magnet mounted thereto being secured to a metal structure, such as an aerial distribution transformer, in accordance with another exemplary embodiment of the present disclosure.
Figure 9C:
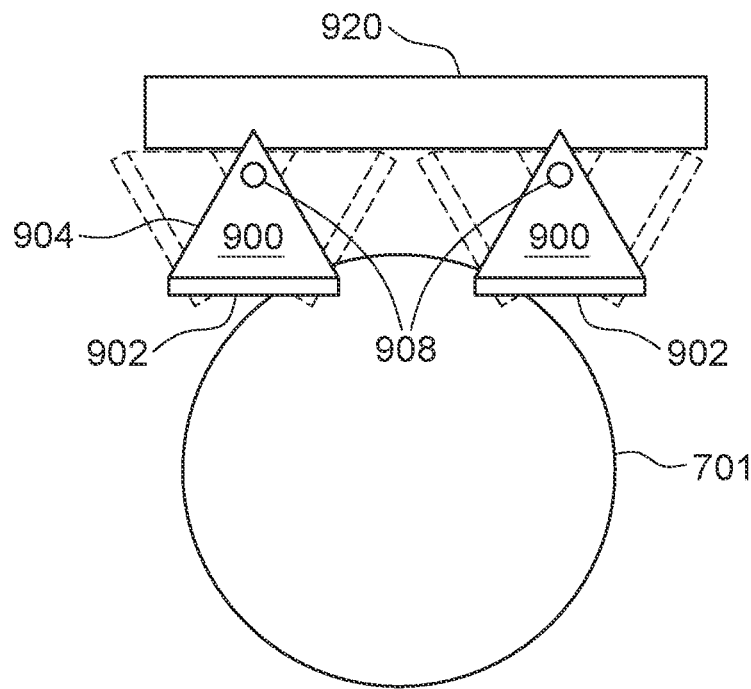
FIG. 9C illustrates a top view of another alternative exemplary electronic device including multiple magnet support brackets of FIG. 9A with magnets mounted thereto being secured to a metal structure, such as an aerial distribution transformer, in accordance with another exemplary embodiment of the present disclosure.

FIGS. 9A-9C illustrate an alternative magnet support bracket 900 for an electronic device 920, in accordance with further exemplary embodiment of the present disclosure. According to this embodiment, the magnet support bracket 900 includes a platform 901 to which a magnet 902 is attached (e.g., with a fastener or otherwise as discussed above with respect to FIGS. 1 and 2), a pair of pivot arms 903, 904 spaced apart along an axis of rotation such that the platform 901 is positioned between the pair of pivot arms 903, 904, and a pin 908 positioned in pin apertures 906 defined by the pair of pivot arms 903, 904. Each pivot arm 903, 904 defines a respective pin aperture 906 and is oriented in a common direction substantially orthogonal to the platform 901. According to one exemplary embodiment, the pivot arms 903, 904 may be connected to opposite lengthwise ends of the platform 901. As illustrated in FIG. 9B, a magnet and support bracket assembly containing the magnet 902 and the support bracket 900 may form part of an electronic device 920 to be magnetically attached to a metal surface of a structure, such as a distribution transformer 701. The magnet and support bracket assembly is rotatable about the axis of rotation as defined by the centerline of the pin 908 up to a maximum angular displacement.

In an alternative embodiment as illustrated in FIG. 9C, the electronic device 920 may include two or more magnet and support bracket assemblies, each containing the magnet 902 and the support bracket 900, positioned in respective magnet attachment areas of the electronic device housing. In this case, each magnet and support bracket assembly is individually rotatable about an axis of rotation as defined by the center of the pin 908 of the respective magnet support bracket 900 up to a maximum angular displacement.

Figure 10A:
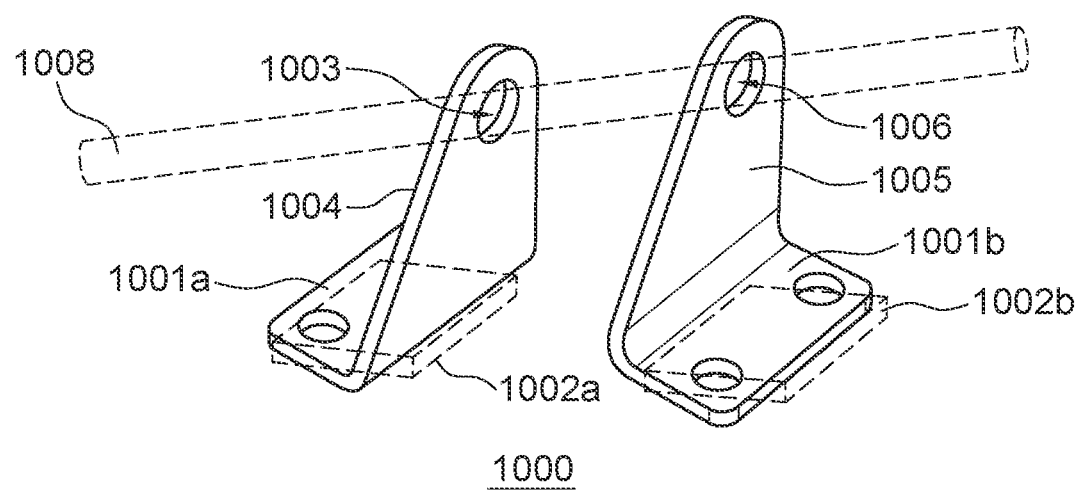
FIG. 10A illustrates a perspective view of yet another alternative magnet support bracket for an electronic device, in accordance with a further exemplary embodiment of the present disclosure.
Figure 10B:
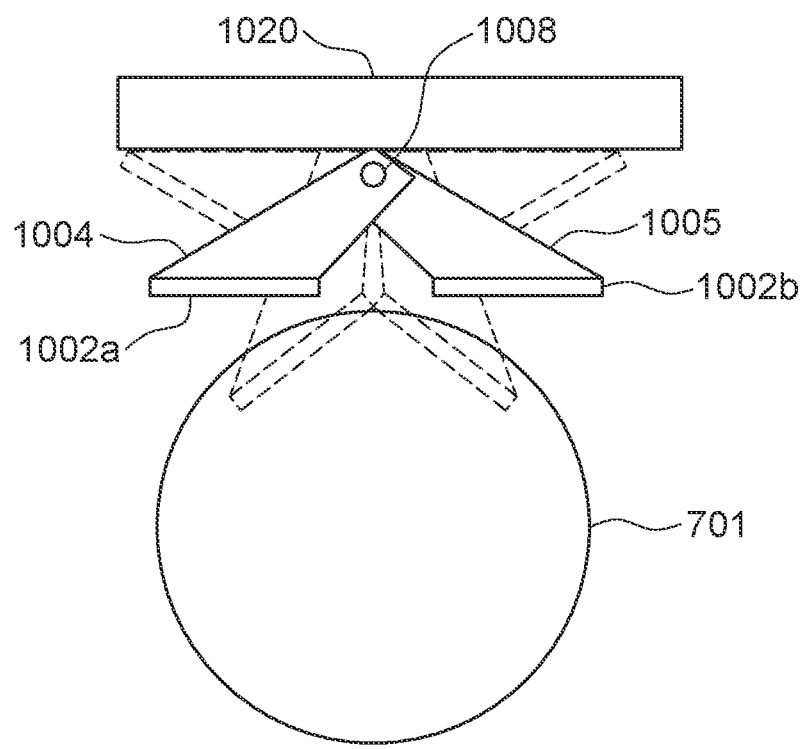
FIG. 10B illustrates a top view of another alternative exemplary electronic device including the magnet support bracket of FIG. 10A with magnet members mounted thereto being secured to a metal structure, such as an aerial distribution transformer, in accordance with another exemplary embodiment of the present disclosure.

FIGS. 10A and 10B illustrate another alternative magnet support bracket 1000 for an electronic device 1020, in accordance with further exemplary embodiment of the present disclosure. According to this embodiment, the magnet support bracket 1000 includes a multi-section platform, a pair of pivot arms 1004, 1005, and a pin 1008. The platform includes two platform sections 1001a, 1001b to which magnet sections 1002a, 1002b of a multi-section magnet are attached. Each magnet section 1002a, 1002b may be attached to its respective platform section 1001a, 1001b with a fastener or otherwise as discussed above with respect to FIGS. 1 and 2. Each pivot arm 1004, 1005 defines a respective pin aperture 1003, 1006, and the pin 1008 is positioned in and/or through the pin apertures 1003, 1006. The centerline of the pin 1008 defines the axis of rotation of the bracket 1000 and the combined magnet and support bracket assembly. As illustrated in FIG. 10B, a magnet and support bracket assembly containing the magnet sections 1002a, 1002b and the support bracket 1000 may form part of an electronic device 1020 to be magnetically attached to a metal surface of a structure, such as a distribution transformer 701. Each pivot arm 1004, 1005 is independently rotatable about the axis of rotation as defined by the centerline of the pin 1008 up to a respective maximum angular displacement.

Figure 11:
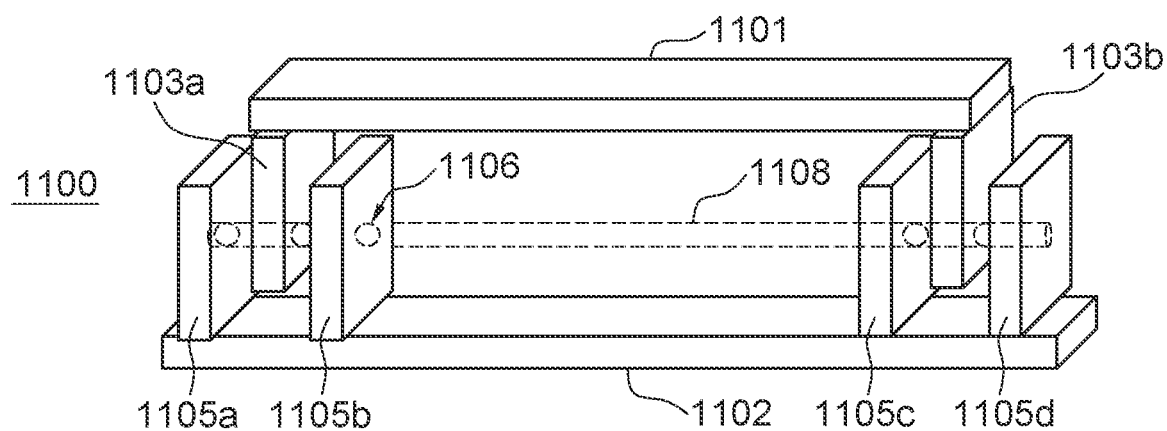
FIG. 11 is a perspective view of yet another alternative magnet support bracket for inclusion in a magnet attachment area of an alternative electronic device, in accordance with a further exemplary embodiment of the present disclosure.

FIG. 11 illustrates another alternative magnet support bracket 1100 for an electronic device, in accordance with further exemplary embodiment of the present disclosure. According to this embodiment, the bracket 1100 includes a platform 1102, two pairs of pivot arms (first pair 1105a, 1105b and second pair 1105c, 1105d), and a pin 1108. The pivot arms 1105a-1105d define respective pin apertures 1106 to permit passage of the pin 1108. In this embodiment, the magnet 1101 includes a pair of magnet arms 1103a, 1103b oriented orthogonal to the magnetic element. Each magnet arm 1103a, 1103b also defines a respective pin aperture 1106 to permit passage of the pin 1108. Each magnet arm 1103a, 1103b is positioned between a respective pair of pivot arms such that the pin apertures 1106 of the magnet arms 1103a, 1103b and the pivot arms 1105a-1105c are aligned. The pin is then inserted into and through the pin apertures 1106. Once fully assembled, the magnet 1101 is rotatable about the axis of rotation as defined by the centerline of the pin 1108 up to a respective maximum angular displacement.

Figure 12:
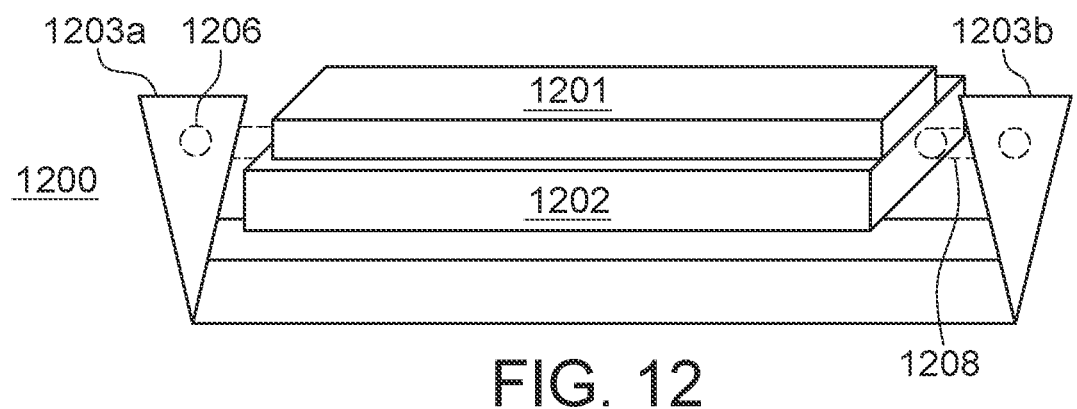
FIG. 12 illustrates a perspective view of yet another alternative magnet support bracket for an electronic device, in accordance with a further exemplary embodiment of the present disclosure.

FIG. 12 illustrates another alternative magnet support bracket 1200 for an electronic device, in accordance with further exemplary embodiment of the present disclosure. The magnet support bracket 1200 includes a platform 1202 to which a magnet 1201 is attached (e.g., with a fastener or otherwise as discussed above with respect to FIGS. 1 and 2), a pair of pivot arms 1203a, 1203b spaced apart along an axis of rotation such that the platform 1202 is positioned between the pair of pivot arms 1203a, 1203b, and a pin 1208 positioned in and/or through pin apertures 1206 defined by the pair of pivot arms 1203a, 1203b. Each pivot arm 1203a, 1203b defines a respective pin aperture 1206 and is oriented in a common direction substantially orthogonal to the platform 1202. According to one exemplary embodiment, the pivot arms 1203a, 1203b may be connected to opposite lengthwise ends of the platform 1202. In this embodiment, the pivot arms are fixedly positioned and the platform 1202 defines a cylindrical aperture through a length thereof. The pin 1208 passes through the platform aperture the platform 1202 and its attached magnet 1201 may rotate about the axis of rotation as defined by the centerline of the pin 1208 up to a maximum angular displacement. The magnet and support bracket assembly containing the magnet 1201 and the support bracket 1202 may form part of an electronic device to be magnetically attached to a metal surface of a structure.

Figure 13:
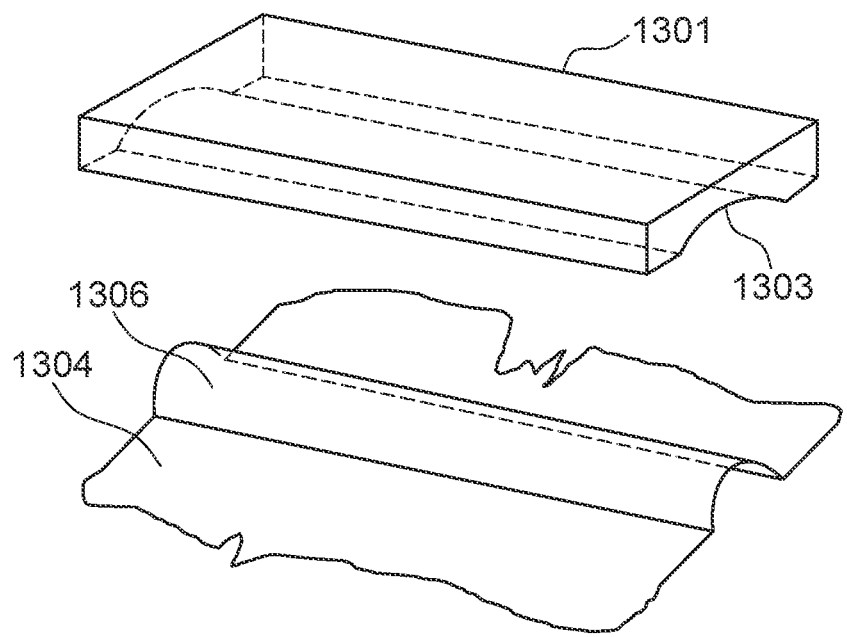
FIG. 13 illustrates a perspective view of an alternative magnet support bracket and pivot member for an alternative electronic device, in accordance with a further exemplary embodiment of the present disclosure.

FIG. 13 illustrates yet another alternative magnet support bracket for an electronic device, in accordance with further exemplary embodiment of the present disclosure. The magnet support bracket includes a platform 1301 having a first surface and a second surface, where at least a portion of the first surface of the platform 1301 supports the magnet and where at least a portion 1303 of the second surface of the platform 1301 is arched with an arc radius greater than an arc radius of an arched portion of a pivot member 1306 of the electronic device housing 1304. In this case, the length of the pivot member 1306 is substantially equal to the length of the platform 1301 and the magnet support bracket is rotatable about an axis of rotation as defined by the centerline of the pivot member 1306 up to a maximum angular displacement (e.g., up to 30 degrees).

In the absence of any specific clarification related to its express use in a particular context, where the terms "substantially," "approximately," "generally," or "about" are used as modifiers in the present disclosure and any appended claims (e.g., to modify a structure, a dimension, a measurement, or some other characteristic), it is understood that the characteristic may vary by up to 30 percent. For example, a pivot arm may be described as being mounted "substantially orthogonal" to a platform. In these cases, a device that is mounted exactly orthogonal is mounted along a "Y" axis and a "X" axis that is normal (i.e., 90 degrees or at right angle) to a plane or line formed by a "Z" axis. Different from the exact precision of the term "orthogonal," the use of "substantially" or "about" to modify the characteristic permits a variance of the particular characteristic by up to 30 percent.

The terms "include" and "comprise," as well as derivatives thereof are to be construed without limitation in an open, inclusive sense, (e.g., "including, but not limited to"). The term "or," is inclusive, meaning "and/or." The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

Reference throughout this specification to "one embodiment" or "an embodiment" or "some embodiments" and variations thereof mean that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content and context clearly dictates otherwise. It should also be noted that the conjunctive terms, "and" and "or" are generally employed in the broadest sense to include "and/or" unless the content and context clearly dictates inclusivity or exclusivity. In addition, the composition of "and" and "or" when recited herein as "and/or" is intended to encompass an embodiment that includes all the associated items or elements and one or more other alternative embodiments that include fewer than all of the associated items or elements.

In the present disclosure, conjunctive lists may make use of a comma, which may be known as an Oxford comma, a Harvard comma, a serial comma, or another like term. Such lists are intended to connect words, clauses, or sentences such that the thing following the comma is also included in the list.

Except as the context may dictate otherwise, the singular shall mean the plural and vice versa. Also, the masculine shall mean the feminine and vice versa. The various embodiments described above can be combined to provide further embodiments. Additionally, aspects of the disclosed embodiments can be modified to employ concepts from patents, published patent applications, and printed publications to provide further embodiments.

What is claimed is:

1. An electronic device attachable to an object having a flat or curved attachment surface, the electronic device comprising:
    a housing having an external surface and defining a magnet attachment area on the external surface;
    a bracket positioned in the magnet attachment area, the bracket being configured to permit angular displacement of at least a portion thereof about an axis of rotation by no more than a predetermined angular displacement; and
    a magnet attached to the bracket.

2. The electronic device of claim 1, further comprising:
    at least one pivot member located in the magnet attachment area and upon which at least part of the bracket is positioned.

3. The electronic device of claim 2, wherein the at least one pivot member includes a pair of spaced apart pivot members and wherein the bracket includes a pair of pivot arms sized and shaped to rest upon and rotate about the pair of pivot members.

4. The electronic device of claim 2, wherein the at least one pivot member includes an arched portion having a first arc radius and wherein a portion of the bracket to which the magnet is not directly attached is arched with a second arc radius that is greater than the first arc radius.

5. The electronic device of claim 4, wherein the bracket includes:
    a platform having a first surface and a second surface, wherein at least a portion of the first surface of the platform supports the magnet and wherein at least a portion of the second surface of the platform is arched with the second arc radius.

6. The electronic device of claim 1, wherein the bracket includes:
    a platform to which the magnet is attached;
    a pair of pivot arms spaced apart along the axis of rotation such that the platform is positioned between the pair of pivot arms, each pivot arm defining a respective pin aperture and being oriented in a direction substantially orthogonal to the platform; and
    a pin positioned in the pin apertures of the pair of pivot arms.

7. The electronic device of claim 6, wherein a first pivot arm of the pair of pivot arms is connected to a first end of the platform and wherein a second pivot arm of the pair of pivot arms is connected to a second end of the platform.

8. The electronic device of claim 6, wherein the platform defines a cylindrical aperture through a length thereof and wherein the pin passes through the aperture of the platform.

9. An electronic device attachable to an object having a flat or curved attachment surface, the electronic device comprising:
    a housing having an external surface and defining a magnet attachment area on the external surface;
    at least one arched pivot member located in the magnet attachment area;
    a bracket positioned at least in part upon the at least one pivot member, the bracket and the at least one pivot member being sized and shaped to permit angular displacement of at least a portion of the bracket about an axis of rotation by no more than a predetermined angular displacement; and
    a magnet attached to the bracket.

10. The electronic device of claim 9, wherein the at least one pivot member includes a first pivot member and a second pivot member spaced apart from the first pivot member, and wherein the bracket includes:
    a platform configured to support the magnet;
    a first pivot arm attached to the platform at a first location and configured to rest upon the first pivot member; and
    a second pivot arm attached to the platform at a second location and configured to rest upon the second pivot member, wherein the first pivot arm and the second pivot arm are aligned along the axis of rotation.

11. The electronic device of claim 10, wherein the first pivot member has a first arc radius and wherein the first pivot arm includes an arched portion having a second arc radius that is greater than the first arc radius.

12. The electronic device of claim 11, wherein the second pivot member has a third arc radius and wherein the second pivot arm includes a second arched portion having a fourth arc radius that is greater than the third arc radius.

13. The electronic device of claim 10, wherein each of the first pivot arm and the second pivot arm defines an aperture sized and shaped to permit passage of a standoff for a fastener.

14. An electronic device attachable to an object having a flat or curved attachment surface, the electronic device comprising:
    a housing having an external surface and defining a plurality of magnet attachment areas on the external surface;
    a plurality of brackets positioned in the plurality of magnet attachment areas, each bracket being configured to permit angular displacement of at least a portion thereof about a respective axis of rotation by no more than a predetermined angular displacement; and a plurality of magnets, wherein each magnet is attached to a respective bracket of the plurality of brackets.

15. The electronic device of claim 14, further comprising:
at least one pivot member located in each magnet attachment area of the housing, wherein each bracket of the plurality of brackets is positioned at least in part upon the at least one pivot member in an associated magnet attachment area of the plurality of magnet attachment areas.

16. An electronic device attachable to a metallic object having a flat or curved attachment surface, the electronic device comprising:
a housing having an external surface and defining at least one magnet attachment area on the external surface;
at least one bracket positioned in the at least one magnet attachment area, each bracket of the at least one bracket being configured to permit angular displacement of at least a portion thereof about a respective axis of rotation by no more than a predetermined angular displacement; and
at least one magnet, wherein each magnet of the at least one magnet is attached to a respective bracket of the at least one bracket and attachable to the attachment surface of the metallic object.

17. The electronic device of claim 16, further comprising:
at least one pivot member located in each magnet attachment area of the at least one magnet attachment area, wherein each bracket of the at least one bracket is positioned at least in part upon the at least one pivot member in an associated magnet attachment area of the at least one magnet attachment area.

18. The electronic device of claim 17, wherein the at least one pivot member includes a pair of spaced apart pivot members and wherein each bracket of the at least one bracket includes a pair of pivot arms sized and shaped to rest upon and rotate about the pair of pivot members.

19. The electronic device of claim 17, wherein the at least one pivot member includes an arched portion having a first arc radius and wherein a portion of the bracket to which the magnet is not directly attached is arched with a second arc radius that is greater than the first arc radius.

20. The electronic device of claim 19, wherein each bracket of the at least one bracket includes:
a platform having a first surface and a second surface, wherein at least a portion of the first surface of the platform supports the magnet and wherein at least a portion of the second surface of the platform is arched with the second arc radius.

* * * * *